United States Patent
Sumi et al.

(10) Patent No.: US 10,702,919 B2
(45) Date of Patent: Jul. 7, 2020

(54) METHOD FOR MANUFACTURING ALLOY MOLDED PRODUCT

(71) Applicant: Mitsubishi Electric Corporation, Tokyo (JP)

(72) Inventors: Nobuyuki Sumi, Tokyo (JP); Hidetaka Katogi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/344,815

(22) PCT Filed: Dec. 28, 2016

(86) PCT No.: PCT/JP2016/089191
§ 371 (c)(1),
(2) Date: Apr. 25, 2019

(87) PCT Pub. No.: WO2018/123052
PCT Pub. Date: May 7, 2018

(65) Prior Publication Data
US 2019/0344339 A1    Nov. 14, 2019

(51) Int. Cl.
*B22F 3/00* (2006.01)
*B22F 1/00* (2006.01)
(Continued)

(52) U.S. Cl.
CPC .......... *B22F 1/0048* (2013.01); *B22F 1/0059* (2013.01); *B22F 3/1055* (2013.01);
(Continued)

(58) Field of Classification Search
CPC ..... B22F 1/0096; B22F 1/0048; B22F 1/0059
See application file for complete search history.

(56) References Cited

U.S. PATENT DOCUMENTS

2005/0132843 A1* 6/2005 Jiang .................. C22C 1/051
75/252
2012/0237745 A1   9/2012 Dierkes et al.
(Continued)

FOREIGN PATENT DOCUMENTS

CN    103567447 A    2/2014
JP    10-17902 A     1/1998
(Continued)

OTHER PUBLICATIONS

International Search Report and Written Opinion dated Apr. 11, 2017 for PCT/JP2016/089191 dated Dec. 28, 2016, 10 pages with translation of the International Search Report.
(Continued)

*Primary Examiner* — Scott R Kastler
(74) *Attorney, Agent, or Firm* — Xsensus LLP

(57) ABSTRACT

Obtaining a powder for metallurgy capable of improving a filling rate in a mold or on a table in powder metallurgy. The powder for metallurgy includes a plurality of secondary particles obtained by combining a plurality of primary particles with a binder. The characteristics of the powder for metallurgy is any one of that the plurality of primary particles includes first primary particles and second primary particles having different shapes from each other, that the second primary particle enters a gap between the first primary particles, that the plurality of primary particles includes first primary particles and second primary particles having different peaks of particle sizes from each other in a particle size distribution, or that the plurality of secondary particles includes first secondary particles and second secondary particles having different peaks of particle sizes from each other in a particle size distribution.

12 Claims, 7 Drawing Sheets

(51) Int. Cl.
  *B22F 3/105* (2006.01)
  *B22F 3/16* (2006.01)
  *B33Y 10/00* (2015.01)
  *B33Y 70/00* (2020.01)

(52) U.S. Cl.
  CPC ............ *B22F 3/16* (2013.01); *B22F 2999/00* (2013.01); *B33Y 10/00* (2014.12); *B33Y 70/00* (2014.12)

(56) References Cited

U.S. PATENT DOCUMENTS

| | | |
|---|---|---|
| 2014/0037489 A1 | 2/2014 | Hwang |
| 2016/0200045 A1 | 7/2016 | Hopkins et al. |
| 2017/0050268 A1 | 2/2017 | Fujiya et al. |
| 2017/0144248 A1 | 5/2017 | Yoshimura et al. |
| 2017/0189960 A1 | 7/2017 | Ibe |

FOREIGN PATENT DOCUMENTS

| | | |
|---|---|---|
| JP | 11-35378 | 2/1999 |
| JP | 2002-289418 A | 10/2002 |
| JP | 2004-277877 A | 10/2004 |
| JP | 2005-28356 A | 2/2005 |
| JP | 2015-196268 A | 11/2015 |
| JP | 2016-175202 A | 10/2016 |
| JP | 2016-188432 A | 11/2016 |
| WO | 2015151865 A1 | 10/2015 |
| WO | 2015/194678 A1 | 12/2015 |
| WO | 2016/151781 A1 | 9/2016 |

OTHER PUBLICATIONS

Notification of Reasons for Refusal received for Japanese Patent Application No. 2017-557231, dated Jan. 23, 2018, 7 pages including translation.
Decision to Grant a Patent received for Japanese Patent Application No. 2017-557231, dated May 29, 2018, 6 pages including translation.
German Office Action dated Aug. 30, 2019, issued in corresponding German Patent Application No. 112016007477.8, with English Translation, 11 pages.
Chinese Office Action dated Jan. 14, 2020 in Chinese Application No. 201680091825.6.

\* cited by examiner

FIG.3
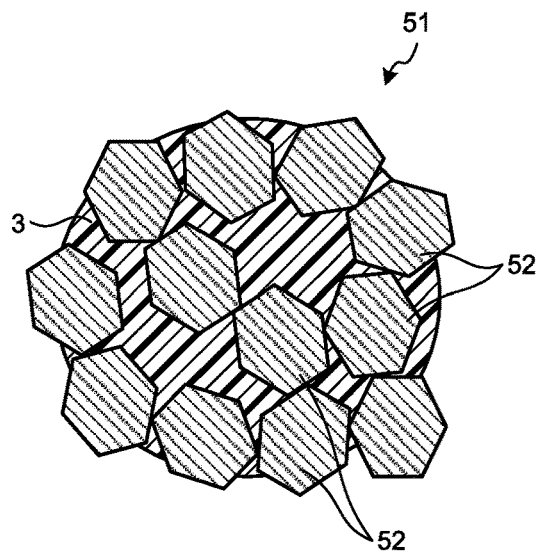
FIG.4
◎ : EXTREMELY EXCELLENT, ○ : EXCELLENT, × : NOT EXCELLENT
| PRIMARY PARTICLE | | | | COM-BINE | SECONDARY PARTICLE | | | |
|---|---|---|---|---|---|---|---|---|
| | SHAPE | COST | FLOW-ABILITY | | SHAPE | COST | FLOW-ABILITY | HOLE/GAP |
| MIXED SHAPES | ELLIPTIC SHAPE+ SQUARE | ◎ | × | → | SPHERICAL SHAPE | ○ | ○ | ○ |
| | ELLIPTIC SHAPE+ FLAKE-LIKE SHAPE | ◎ | × | → | SPHERICAL SHAPE | ○ | ◎ | ◎ |
| | SQUARE+ FLAKE-LIKE SHAPE | ◎ | × | → | SPHERICAL SHAPE | ○ | ◎ | ◎ |
FIG.5
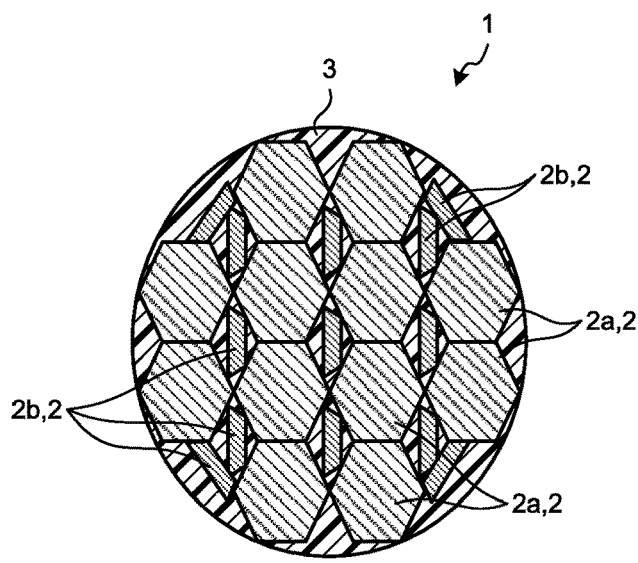

METHOD FOR MANUFACTURING ALLOY MOLDED PRODUCT

CROSS-REFERENCE TO RELATED APPLICATION

The present application is based on PCT filing PCT/JP2016/089191 filed Dec. 28, 2016, the entire contents of which are incorporated herein by reference.

FIELD

The present invention relates to a powder for metallurgy including a plurality of secondary particles obtained by combining a plurality of primary particles with a binder which is a binding agent and a method for manufacturing a molded product using the powder for metallurgy.

BACKGROUND

A method for manufacturing a molded product includes a powder metallurgy method for manufacturing a molded product by solidifying powders. The powder metallurgy method includes a die press molding method for manufacturing a molded product by performing sintering after the powders are filled into a mold and compressed and molded by a molding machine.

Furthermore, the powder metallurgy method includes a powder lamination molding method. As a method of the powder lamination molding method, a power bed fusion method and a binding agent spraying method are exemplified. The power bed fusion method is a method for manufacturing a molded product by repeatedly emitting laser or an electric beam toward the powders spread on a table and sintering or melting the powders. The binding agent spraying method is a method for manufacturing a molded product by repeatedly spraying a binding agent toward the powders spread on the table and combining the powders.

Here, in the die press molding method, a high filling rate of the powders filled into the mold is required. Furthermore, even in the powder lamination molding method as exemplified by the power bed fusion method and the binding agent spraying method, a high filling rate of the powders spread on the table is required. In order to improve the filling rate of the powders, it is essential to increase flowability of the powders.

Furthermore, as a method of the powder lamination molding method, a directional energy method is exemplified. The directional energy method is a method for manufacturing a molded product by spraying powders toward a place irradiated with laser or arc which is a heat source and melting and concreting the powders at the irradiation position. Even in the powder lamination molding method as exemplified by the directional energy method, the high flowability of the powder is essential in order to prevent clogging in a flow path through which the sprayed powders pass.

In Patent Literature 1, a secondary particle obtained by three-dimensionally combining primary particles with gaps is used for a powder used in the powder metallurgy method. In Patent Literature 1, by using the secondary particle obtained by combining the primary particles, a particle size of the secondary particle is made larger than the primary particle, and flowability of the power is improved. Note that, as the powder used in the powder metallurgy method, a nonmetallic powder can be exemplified, in addition to a metallic powder. The nonmetallic powder used in the powder metallurgy method includes a ceramic powder.

CITATION LIST

Patent Literature

Patent Literature 1: International Publication No. 2015/194678

SUMMARY

Technical Problem

However, with the powder disclosed in Patent Literature 1, although the gap between the secondary particles is reduced by the improvement of the flowability and a filling rate of the secondary particles is improved, there is a case where a filling rate of the primary particles in the whole powders filled in the mold or the filling rate of the primary particles in the whole powders spread on the table is deteriorated due to the gaps provided between the primary particles.

The present invention has been made in consideration of the above. An object of the present invention is to obtain a powder for metallurgy capable of improving a filling rate in a mold or on a table in powder metallurgy.

Solution to Problem

To solve the above problems and achieve the object a powder for metallurgy according to the present invention includes: a plurality of secondary particles obtained by combining a plurality of primary particles with a binder. The plurality of primary particles includes first primary particles and second primary particles having different shapes from each other, and the second primary particle enters a gap between the plurality of first primary particles.

Advantageous Effects of Invention

A powder for metallurgy according to the present invention has an effect of improving a filling rate of the powder for metallurgy in a mold or on a table in powder metallurgy.

BRIEF DESCRIPTION OF DRAWINGS

FIG. 3 is a diagram illustrating a secondary particle according to a comparative example.

FIG. 4 is a diagram illustrating a relationship between the shapes and the flowability of the secondary particle used for the powder for metallurgy according to a first modification of the embodiment and the primary particle included in the secondary particle.

FIG. 5 is a diagram illustrating the secondary particle used for the powder for metallurgy according to the first modification of the embodiment.

DESCRIPTION OF EMBODIMENTS

Hereinafter, a powder for metallurgy according to an embodiment of the present invention and a method for manufacturing a molded product using the powder for metallurgy will be described in detail with reference to the drawings. The present invention is not limited to the embodiment.

Embodiment

In the embodiment, a plurality of secondary particles obtained by combining a plurality of primary particles with a binder is a powder for metallurgy used for powder metallurgy. First, the primary particle used for the powder for metallurgy will be described.

Figure 1:
FIG. 1 is a diagram illustrating a relationship between shapes and flowability of a secondary particle used for a powder for metallurgy according to an embodiment of the present invention and a primary particle included in the secondary particle.

FIG. 1 is a diagram illustrating a relationship between shapes and flowability of the secondary particle used for the powder for metallurgy according to the embodiment of the present invention and the primary particle included in the secondary particle. As a material of the primary particle, metal, ceramic, or cermet is used.

As illustrated in FIG. 1, the primary particles have various shapes such as a spherical shape, an elliptic shape, a square shape, and a flake shape. The elliptic shape and the square shape indicate a cross-sectional shape of the primary particle, and the primary particle has a three-dimensional shape.

The primary particle having a spherical shape exhibits high flowability regardless of the size of the primary particle. Therefore, even if the primary particle is used as the powder for metallurgy, it is possible to improve a filling rate to a mold. Here, the spherical primary particle can be manufactured by a plasma atomization method and a gas atomization method. However, to manufacture the primary particle by the plasma atomization method and the gas atomization method increases a manufacturing cost.

On the other hand, the elliptic, square, and flake-like primary particle, that is, a non-spherical primary particle can be manufactured by water atomization method or crushing which can lower the manufacturing cost in comparison with the plasma atomization method and the gas atomization method. However, the non-spherical primary particle has lower flowability than the spherical primary particle. Therefore, in a case where the primary particle is used as the powder for metallurgy, the filling rate to the mold is lowered, and there is a possibility to deteriorate a quality of the molded product.

Note that, a method for evaluating the flowability of the powder includes comparison of sizes of angles of repose. The angle of repose is an angle formed by a slope of a powder mountain and a horizontal plane in a state where the mountain is stably maintained without collapse when powders are dropped and piled. The smaller the angle of repose is, the higher the flowability is.

Figure 2:
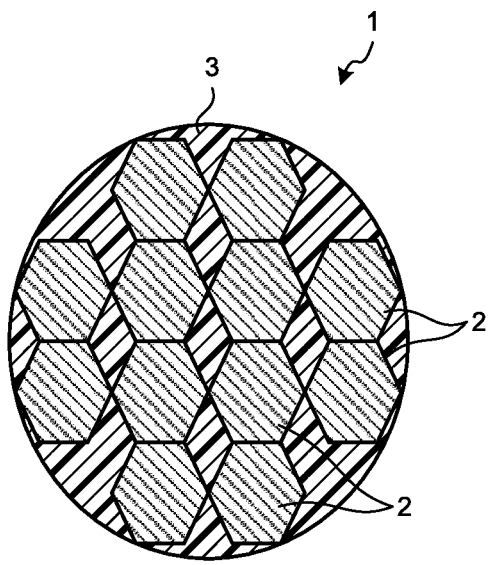
FIG. 2 is a diagram illustrating the secondary particle used for the powder for metallurgy according to the embodiment.

Next, a secondary particle obtained by combining the primary particles will be described. In the embodiment, the secondary particle is obtained by combining the non-spherical primary particles, and the secondary particle is used as the powder for metallurgy. FIG. 2 is a diagram illustrating the secondary particle used for the powder for metallurgy according to the embodiment. As illustrated in FIG. 2, the powder for metallurgy according to the embodiment is a secondary particle 1 obtained by combining a plurality of primary particles 2 with a binder 3 and molding the primary particles into a spherical shape or a shape close to the spherical shape. Note that it is assumed that a single secondary particle 1 include three or more primary particles 2. Examples of the binder 3 include carboxymethyl cellulose and polyvinyl pyrrolidone. Furthermore, in FIG. 2, an example using the square primary particle 2 as the non-spherical primary particle 2 is illustrated. However, the present invention is not limited to this, and the elliptic or flake-like primary particle 2 or a primary particle 2 having other shape may be used.

In the secondary particle 1, the plurality of primary particles 2 is combined so that a gap between the primary particles 2 is minimized. In the following description, a state where the plurality of primary particles 2 is combined so as to minimize the gap is referred to as a closest packing state. Furthermore, the closest packing state can also be said to be a state where a proportion of the primary particles 2 in a unit volume of the secondary particle 1 is the highest. The primary particles 2 are combined in the closest packing state so that the spherical secondary particle 1 is easily made. The method for combining the primary particles 2 includes a rolling granulation method for granulating in a rotating container, a spray granulation method for granulating by splaying a material in an air stream, and the like.

FIG. 3 is a diagram illustrating a secondary particle according to a comparative example. In a secondary particle 51 according to the comparative example, although multiple non-spherical primary particles 52 are combined with the binder 3, a gap between the primary particles 52 is larger than that in the closest packing state. In the secondary particle 51 according to the comparative example, even when the filling rate of the secondary particle 51 is increased, there is a case where the filling rate of the primary particle 52 is decreased by the gap between the primary particles 52. Furthermore, since the gap is large, arrangement of the primary particles 52 varies, and the secondary particle 51 hardly has a spherical shape.

On the other hand, in the secondary particle 1 which is the powder for metallurgy according to the embodiment, the primary particles 2 are combined with each other in the closest packing state. Therefore, it is possible to improve the filling rate of the primary particles 2 in the powder metallurgy. Accordingly, it is possible to improve the quality of the molded product manufactured by powder metallurgy.

Furthermore, since the secondary particle 1 is molded into a spherical shape or a shape close to the spherical shape, as illustrated in FIG. 1, the flowability of the secondary particle 1 can be improved. Therefore, it is possible to improve the filling rate of the secondary particle 1 in powder metallurgy.

Furthermore, even if the non-spherical primary particle 2 is used in the secondary particle 1, the secondary particle 1 is molded into a spherical shape or a shape close to the spherical shape. Therefore, the flowability of the secondary particle 1 which is the powder for metallurgy is improved. Therefore, the powder for metallurgy can be manufactured by using the non-spherical primary particle 2 which reduces the manufacturing cost in comparison with the spherical primary particle 2, and the manufacturing cost of the powder for metallurgy can be reduced. Furthermore, regardless of the shape and the size of the primary particle 2, it is possible to improve the flowability by forming the spherical secondary particle 1 or the secondary particle 1 having a shape close to the spherical shape. Therefore, a degree of freedom in selecting powder used for the primary particle 2 is increased. This makes it possible to employ the primary particle 2 having a lower cost from the viewpoint of the shape and the size, and the manufacturing cost of the powder for metallurgy can be further reduced.

Furthermore, by forming the secondary particle 1 by combining the plurality of primary particles 2, a particle size of the secondary particle 1 which is the powder for metallurgy can be increased. Accordingly, safety at the time of performing the powder metallurgy can be improved than a case where the primary particle 2 having a small particle size is used as the powder for metallurgy. Note that, by applying an antistatic agent to the primary particle 2, the safety at the time of forming the secondary particle 1 can be improved.

Furthermore, by changing the number of primary particles 2 included in the secondary particle 1, the size of the secondary particle 1 can be changed. Therefore, the secondary particles 1 having various particle sizes can be easily manufactured.

A secondary particle used for the powder for metallurgy according to a first modification of the embodiment will be described. FIG. 4 is a diagram illustrating a relationship between the shapes and the flowability of the secondary particle used for the powder for metallurgy according to the first modification of the embodiment and the primary particle included in the secondary particle. FIG. 5 is a diagram illustrating the secondary particle 1 used for the powder for metallurgy according to the first modification of the embodiment. The secondary particle 1 used for the powder for metallurgy according to the first modification is formed by combining the non-spherical primary particles 2 having various shapes with the binder 3.

In FIG. 5, an example is illustrated in which square first primary particles 2a and flake-like second primary particles 2b are included in the secondary particle 1. As illustrated in FIG. 5, the flake-like second primary particle 2b enters a gap between the first primary particles 2a combined in the closest packing state so that the proportion of the primary particles 2 in the entire secondary particle 1 can be improved. With this structure, the filling rate of the primary particle 2 in the powder metallurgy can be further improved.

Furthermore, the second primary particles 2b enter uneven portions formed on the surface of the secondary particle 1 by the first primary particles 2a, and the surface becomes smoother than the surface of the secondary particle 1 including the primary particles 2 having the same shape. With this structure, a mold to which the powders for metallurgy are filled in the powder metallurgy and a member on which the powders for metallurgy are spread are hardly scraped by the secondary particle 1. That is, it is possible to prolong lives of the mold to which the powders for metallurgy are filled and the member on which the powders for metallurgy are spread.

Furthermore, a combination of the shapes of the first primary particles 2a and the second primary particles 2b may be a combination of the elliptic shape and the square shape as illustrated in FIG. 4, a combination of the elliptic shape and the flake-like shape, or a combination of other shapes. The number of the shapes of the primary particles 2 included in the secondary particle 1 is not limited to two, and three or more kinds of shapes of primary particles 2 may be included.

Furthermore, a material of the first primary particle 2a may be different from a material of the second primary particle 2b. If the material of the first primary particle 2a is made different from the material of the second primary particle 2b and the first primary particles 2a and the second primary particles 2b are melted in a molding process, a molded product formed of an alloy can be obtained. That is, it is possible to easily obtain the molded product formed of an alloy without using the primary particle 2 which has been made as an alloy in advance. For example, if iron is used for the first primary particles 2a and chromium is used for the second primary particles 2b, a molded product formed of an iron-chromium alloy can be obtained. Note that a sintered body obtained by sintering the first primary particles 2a and the second primary particles 2b may be formed as a molded product.

Furthermore, by changing a mixing ratio of the first primary particles 2a and the second primary particles 2b with different materials, an alloy ratio can be easily adjusted. If the molded product is a sintered body, a ratio of the plurality of materials included in the sintered body can be easily adjusted.

Figure 6:
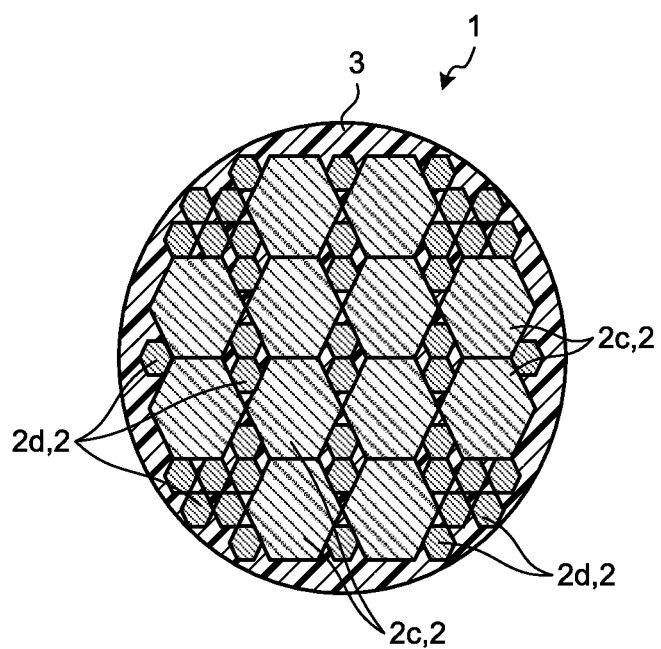
FIG. 6 is a diagram illustrating the secondary particle used for the powder for metallurgy according to a second modification of the embodiment.

A secondary particle used for the powder for metallurgy according to a second modification of the embodiment will be described. FIG. 6 is a diagram illustrating the secondary particle 1 used for the powder for metallurgy according to the second modification of the embodiment. The secondary particle 1 used for the powder for metallurgy according to the second modification is formed by combining first primary particles 2c and second primary particles 2d with the binder 3.

Figure 7:
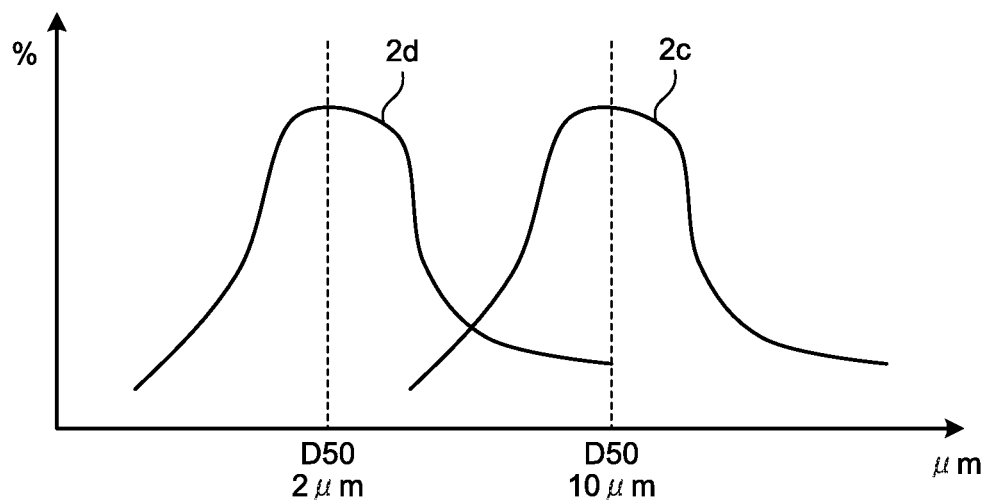
FIG. 7 is a diagram illustrating a particle size distribution of a first primary particle and a second primary particle according to the second modification of the embodiment.

FIG. 7 is a diagram illustrating a particle size distribution of the first primary particle 2c and the second primary particle 2d according to the second modification of the embodiment. As illustrated in FIG. 7, a peak of the particle size in the particle size distribution of the first primary particle 2c is different from a peak of the particle size of the second primary particle 2d. In the particle size distribution, the horizontal axis indicates the particle size (μm), and the vertical axis indicates an existence ratio (percent) relative to the whole powders. As a method for measuring the particle size distribution, a laser diffraction method, an image imaging method, and a gravity sedimentation method are exemplified. The peak of the particle size is a particle diameter which has the highest appearance rate in the particle size distribution and is referred to as a mode diameter of powder of which the particle size distribution is measured. Furthermore, in the particle size obtained from the particle size distribution, a value referred to as D50 is included. Specifically, a particle size, at the time when powders are divided into two particle groups, i.e., a particle having a particle size larger than that of one particle and a particle having a particle size smaller than that of one particle and an amount of the particle having the particle size larger than that of one particle is equal to an amount of the particle having the particle size smaller than that of one particle, is indicated as a value of the D50. In the example illustrated in FIG. 7, an example is illustrated in which the peak of the particle size of the first primary particle 2c and the D50 are both 10 μm and coincide with each other, and the peak of the particle size of the second primary particle 2d and the D50 are both two μm and coincide with each other. However, the peak and the D50 do not necessarily match.

Note that, in the following description, the peak of the particle size in the particle size distribution is simply expressed as a particle size.

As illustrated in FIG. 7, the particle size of the second primary particle 2d is smaller than the particle size of the first primary particle 2c. As illustrated in FIG. 6, the second primary particle 2d having a small particle size enters a gap between the first primary particles 2c combined in the closest packing state so that the proportion of the primary particles 2 in the secondary particle 1 can be improved. With this structure, the filling rate of the primary particle 2 in the powder metallurgy can be further improved.

Furthermore, the second primary particles 2d enter uneven portions formed on the surface of the secondary particle 1 by the first primary particles 2c, and the surface becomes smoother than the surface of the secondary particle 1 including only the first primary particles 2c. With this structure, a mold to which the powders for metallurgy are filled in the powder metallurgy and a member on which the powders for metallurgy are spread are hardly scraped by the secondary particle 1. That is, it is possible to prolong lives of the mold to which the powders for metallurgy are filled and the member on which the powders for metallurgy are spread.

Furthermore, the material of the first primary particle 2c may be different from the material of the second primary particle 2d. If the material of the first primary particle 2c is made be different from the material of the second primary particle 2d and the first primary particle 2c and the second primary particle 2d are melted in a molding process, a molded product formed of an alloy can be obtained. That is, it is possible to easily obtain the molded product formed of an alloy without using the primary particle 2 which has been made as an alloy in advance. For example, if iron is used for the first primary particles 2c and chromium is used for the second primary particles 2d, a molded product formed of an iron-chromium alloy can be obtained. Note that a sintered body obtained by sintering the first primary particles 2c and the second primary particles 2d may be formed as a molded product.

Furthermore, by changing a mixing ratio of the first primary particles 2c and the second primary particles 2d with different materials, an alloy ratio can be easily adjusted. If the molded product is a sintered body, a ratio of the plurality of materials included in the sintered body can be easily adjusted.

Furthermore, in the second modification, an example is indicated in which the number of kinds of the particle size of the primary particle 2 included in the secondary particle 1 is two. However, three or more kinds of the particle size of the primary particle 2 included in the secondary particle 1 may be used.

Figure 8:
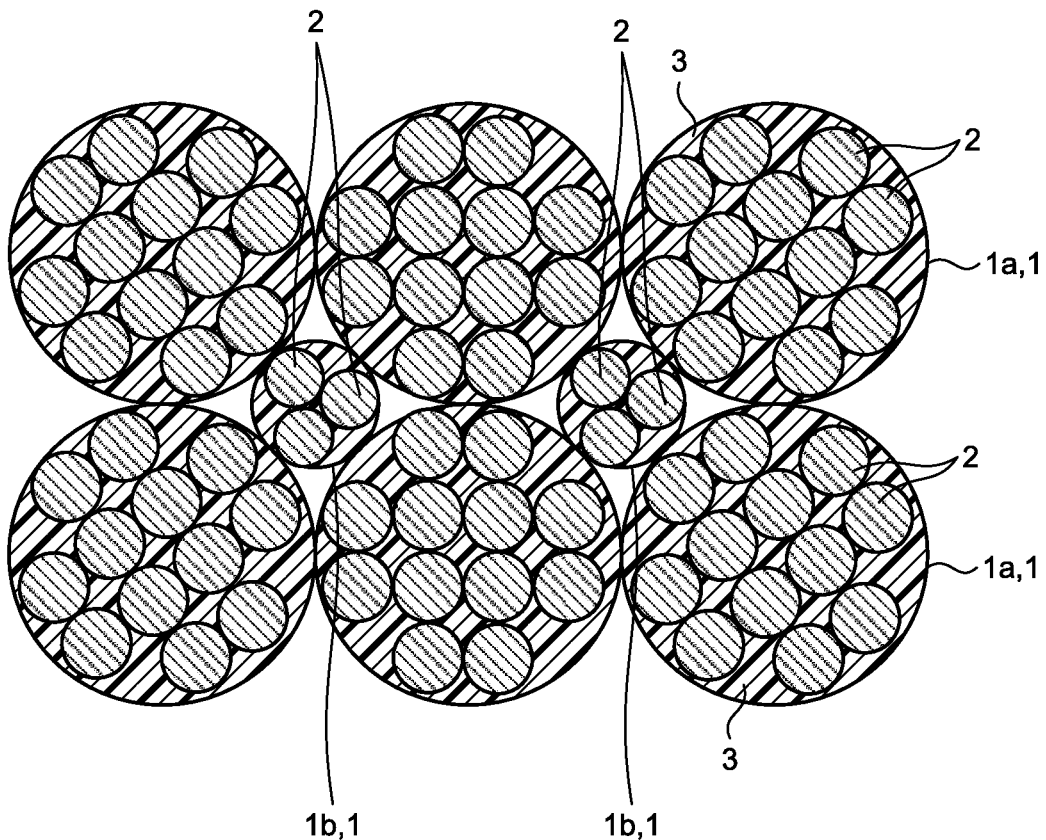
FIG. 8 is a diagram illustrating a state where the secondary particles used for the powder for metallurgy according to a third modification of the embodiment are filled.

A secondary particle used for the powders for metallurgy according to a third modification of the embodiment will be described. FIG. 8 is a diagram illustrating a state where the secondary particles 1 used for the powder for metallurgy according to the third modification of the embodiment are filled. The secondary particle 1 used for powder for metallurgy according to the third modification includes first secondary particles 1a and second secondary particles 1b having different particle sizes.

Figure 9:
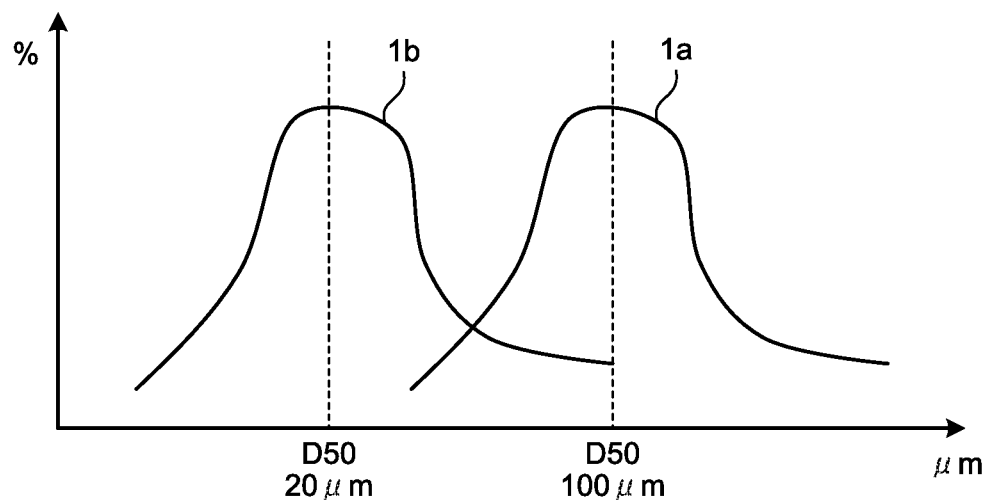
FIG. 9 is a diagram illustrating the particle size distribution of the first secondary particle and the second secondary particle according to the third modification of the embodiment.

FIG. 9 is a diagram illustrating a particle size distribution of the first secondary particle 1a and the second secondary particle 1b in the third modification of the embodiment. As illustrated in FIG. 9, a peak of the particle size of the first secondary particle 1a in the particle size distribution and a peak of the particle size of the second secondary particle 1b are different from each other. In the example illustrated in FIG. 9, an example is illustrated in which the peak of the particle size of the first secondary particle 1a and the D50 are both 100 μm and coincide with each other, and the peak of the particle size of the second secondary particle 1b and the D50 are both 20 μm and coincide with each other. By making the number of primary particles 2 included in the first secondary particle 1a different from the number of primary particles 2 included in the second secondary particle 1b, the particle sizes are made different from each other.

As illustrated in FIG. 9, the particle size of the second secondary particle 1b is smaller than the particle size of the first secondary particle 1a. As illustrated in FIG. 8, the second secondary particle 1b having a small particle size enters a gap between the first secondary particles 1a so that a filling rate of the secondary particle 1 in the powder metallurgy can be improved. With this structure, the filling rate of the primary particles 2 in the powder metallurgy is improved, and the quality of the molded product can be improved.

Furthermore, the material of the primary particle 2 included in the first secondary particle 1a may be different from the material of the primary particle 2 included in the second secondary particle 1b. When the primary particles 2 having different materials are melted in the molding process, a molded product formed of an alloy can be obtained. That is, it is possible to easily obtain the molded product formed of an alloy without using the primary particle 2 which has been made as an alloy in advance. For example, by using iron primary particle 2 and chromium primary particle 2, an iron-chromium molded product can be obtained. Note that a sintered body obtained by sintering the primary particles 2 may be formed as a molded product.

Furthermore, by changing a mixing ratio of the primary particles 2 with different materials, the alloy ratio can be easily adjusted. If the molded product is a sintered body, a ratio of the plurality of materials included in the sintered body can be easily adjusted.

Furthermore, in the third modification, an example is indicated in which the number of particle sizes of the secondary particles 1 is two. However, the number of kinds of particle sizes of the secondary particles 1 may be equal to or more than three. Furthermore, in FIG. 8, for simple illustration, the primary particle 2 is indicated by a circular shape. However, as the primary particle 2 used for the secondary particle 1 described above, the non-spherical primary particle 2 is used in the third modification. Furthermore, it is desirable that the primary particles 2 be combined in the closest packing state in the secondary particle 1.

Figure 10:
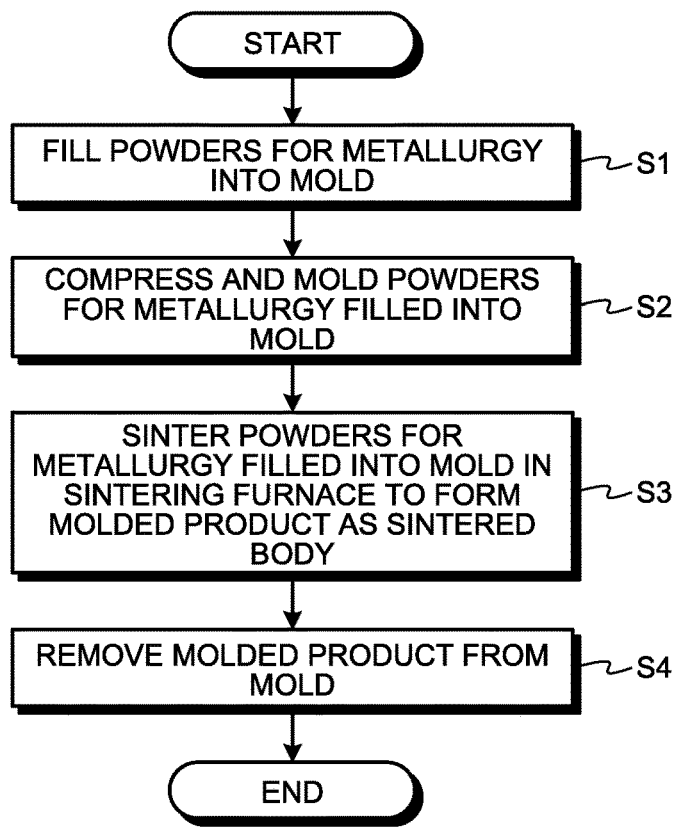
FIG. 10 is a flowchart for explaining a procedure for manufacturing a molded product by a die press molding method by using the powder for metallurgy according to the embodiment.

Next, a process for manufacturing a molded product by the powder metallurgy using the powder for metallurgy described above will be described. FIG. 10 is a flowchart for explaining a procedure for manufacturing a molded product by a die press molding method by using the powder for metallurgy according to the embodiment.

In the die press molding method, first, the powders for metallurgy are filled into the mold (step S1). Next, the powders for metallurgy filled into the mold are compressed and molded (step S2). Next, the powders for metallurgy filled into the mold are sintered in a sintering furnace to form a molded product as a sintered body (step S3). By removing the molded product from the mold and executing post-processing as necessary, the molded product is manufactured (step S4).

Figure 11:
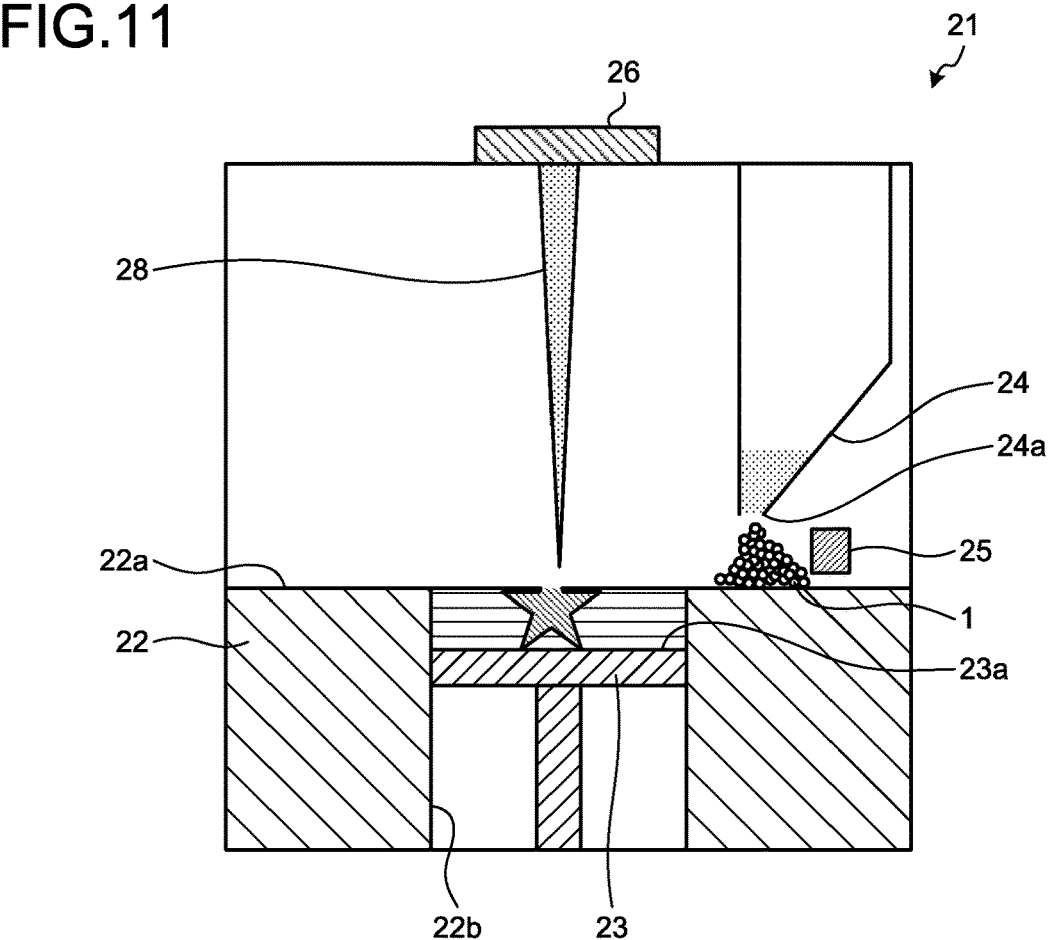
FIG. 11 is a diagram illustrating a schematic configuration of a power-bed-fusion-method powder lamination molding device for manufacturing the molded product by using the powder for metallurgy according to the embodiment.

Next, a procedure for manufacturing a molded product by a power-bed-fusion-method powder lamination molding method by using the powder for metallurgy will be described. FIG. 11 is a diagram illustrating a schematic configuration of a power-bed-fusion-method powder lamination molding device for manufacturing the molded product by using the powder for metallurgy according to the embodiment.

A powder lamination molding device 21 includes a stage 22, a table 23, a tank 24, a squeegee 25, and a laser irradiation unit 26. The stage 22 includes a placement surface 22a where the secondary particle 1 which is a powder for metallurgy horizontally formed is placed. A recess 22b in which the table 23 is housed to be vertically moved is formed in the placement surface 22a of the stage 22.

By vertically moving the table 23 in the recess 22b, a height of a step between a top surface 23a of the table 23 and the placement surface 22a of the stage 22 is changed. In the tank 24, the secondary particles 1 which are the powders for metallurgy are housed. The powders for metallurgy are supplied on the placement surface 22a from a supply port 24a formed in the tank 24.

The squeegee 25 is a plate-like or bar-like member which can move along the placement surface 22a. By moving the squeegee 25 along the placement surface 22a, the powders for metallurgy placed on the placement surface 22a are pushed by the squeegee 25 and moved. By moving the squeegee 25 above the recess 22b, the powders for metallurgy are spread on a step portion between the placement surface 22a and the top surface 23a, that is, an inside space surrounded by the recess 22b and the top surface 23a.

The laser irradiation unit 26 irradiates the powders for metallurgy spread on the step portion with laser light 28. In a portion irradiated with the laser light 28, the powders for metallurgy are sintered or melted and solidified. That is, a part of the powders for metallurgy filled into the step portion can be selectively solidified by the laser light 28.

Figure 12:
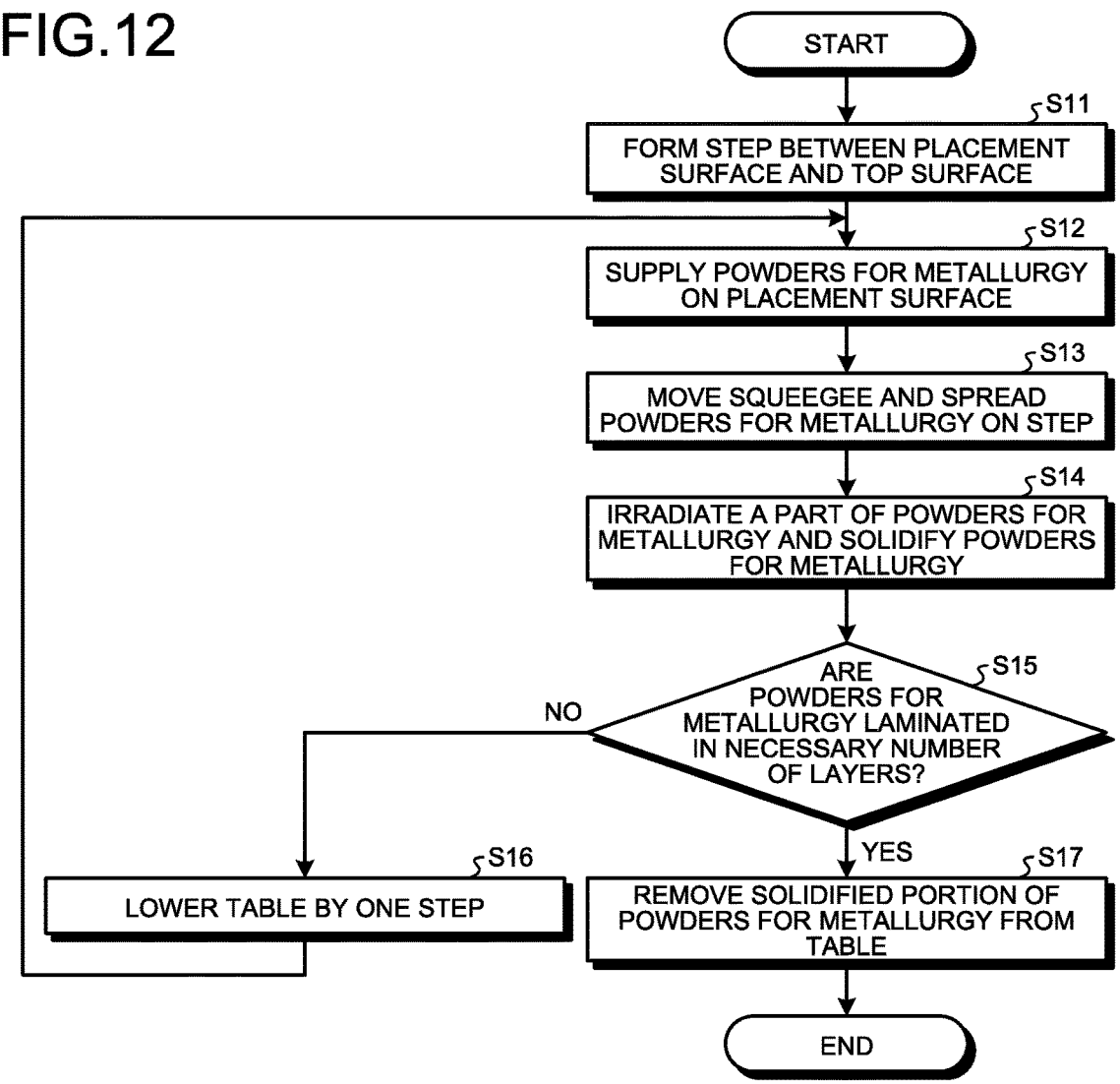
FIG. 12 is a flowchart for explaining a procedure for manufacturing the molded product by a powder lamination molding method by using the powder for metallurgy according to the embodiment and the power-bed-fusion-method powder lamination molding device.

FIG. 12 is a flowchart for explaining a procedure for manufacturing the molded product by the powder lamination molding method by using the powder for metallurgy according to the embodiment and the power-bed-fusion-method powder lamination molding device 21. First, a step is formed between the placement surface 22a and the top surface 23a by lowering the table 23 (step S11). Next, the powders for metallurgy are supplied to the placement surface 22a (step S12). Next, the squeegee 25 is moved, and the powders for metallurgy are spread on the step portion (step S13). Next, a part of the spread powders for metallurgy is irradiated with the laser light 28 and an irradiation position is moved so that the powders for metallurgy in a desired place are solidified (step S14).

Here, in a case where the powders for metallurgy are not laminated in a necessary number of layers to form a molded product having an intended shape on the top surface 23a (No in step S15), the table 23 is lowered by one step (step S16), and a step is formed between the top surface 23a of the powders for metallurgy which are previously fitted into a step and the placement surface 22a. After that, the procedure returns to step S12, and the supply and the solidification of the powders for metallurgy are repeated.

In a case where the powders for metallurgy are laminated in a necessary number of layers in step S15 (Yes in step S15), the solidified portion of the powders for metallurgy is removed from the table 23 (step S17) so that a molded product is manufactured. Note that the irradiation position of the laser light 28 may be moved by scanning the laser light 28 by a mirror which is not illustrated or may be moved by providing a moving mechanism for moving the laser irradiation unit 26.

Note that, the powder lamination molding device 21 illustrated in FIG. 11 may be formed as a binding agent spraying type powder lamination molding device 21 by providing a binding agent spraying unit for spraying the binder which is the binding agent instead of the laser irradiation unit 26. In this case, by spraying the binding agent to a part of the powders for metallurgy in step S14 and solidifying the powders for metallurgy in the part where the binding agent is sprayed, the molded product is manufactured.

Figure 13:
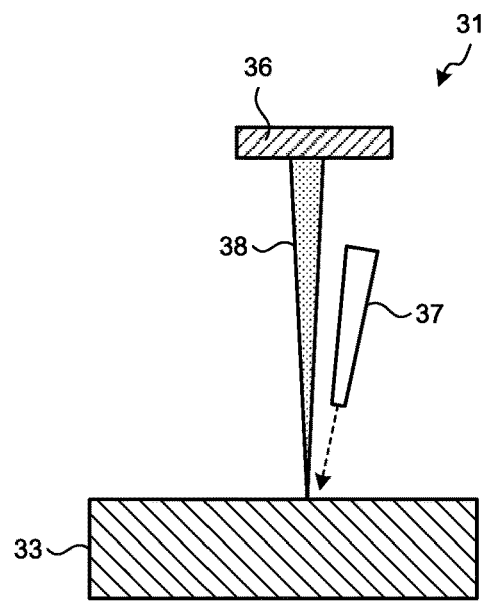
FIG. 13 is a diagram illustrating a schematic configuration of a directional-energy-method powder lamination molding device for manufacturing the molded product by using the powder for metallurgy according to the embodiment.

Next, another procedure for manufacturing a molded product by a powder lamination molding method by using the powder for metallurgy will be described. FIG. 13 is a diagram illustrating a schematic configuration of a directional-energy-method powder lamination molding device for manufacturing a molded product by using the powder for metallurgy according to the embodiment.

A powder lamination molding device 31 includes a table 33, a laser irradiation unit 36, and a nozzle 37. The laser irradiation unit 36 irradiates the table 33 with laser light 38. The nozzle 37 sprays the powders for metallurgy toward a place irradiated with the laser light 38.

At the place irradiated with the laser light 38, the powders for metallurgy are melted or sintered and solidified. By moving the irradiation position with the laser light 38 and the position to which the powders for metallurgy are sprayed, it is possible to solidify the powders for metallurgy at a desired place and mold a molded product according to an intended shape.

Figure 14:
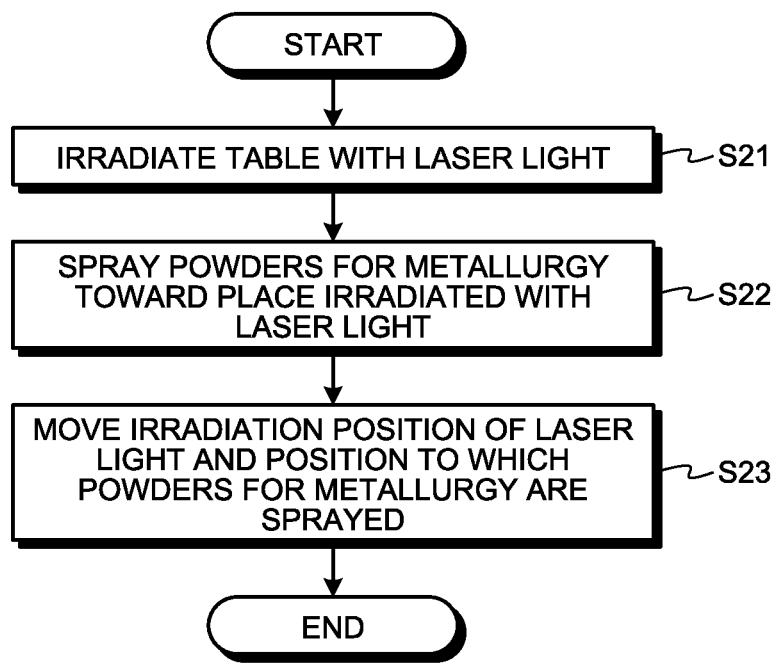
FIG. 14 is a flowchart for explaining a procedure for manufacturing the molded product by a powder lamination molding method by using the powder for metallurgy according to the embodiment and the directional-energy-method powder lamination molding device.

FIG. 14 is a flowchart for explaining a procedure for manufacturing the molded product by a powder lamination molding method by using the powder for metallurgy according to the embodiment and the directional-energy-method powder lamination molding device 31. First, the laser light 38 is emitted toward the table 33 (step S21). Next, the powders for metallurgy are sprayed toward a place irradiated with the laser light 38 (step S22). Next, by moving the irradiation position of the laser light 38 and the position to which the powders for metallurgy are sprayed in association with each other (step S23), it is possible to solidify the powders for metallurgy at a desired position and manufacture a molded product. Note that the irradiation position of the laser light 38 may be moved by scanning the laser light 38 by the mirror which is not illustrated or may be moved by moving the laser irradiation unit 36. Furthermore, the position to which the powders for metallurgy are sprayed may be moved by changing a spray angle of the nozzle 37 or may be moved by providing a moving mechanism for moving the nozzle 37. Furthermore, since the flowability of the powder for metallurgy according to the embodiment is improved, occurrence of clogging of the powders in the nozzle 37 can be prevented.

The structures illustrated in the above embodiment indicate exemplary contents of the present invention and can be combined with other known technique. Furthermore, the structures illustrated in the embodiment can be partially omitted and changed without departing from the scope of the present invention.

REFERENCE SIGNS LIST

1 secondary particle; 1*a* first secondary particle; 1*b* second secondary particle; 2 primary particle; 2*a*, 2*c* first primary particle; 2*b*, 2*d* second primary particle; 3 binder; 21, 31 powder lamination molding device; 22 stage; 22*a* placement surface; 22*b* recess; 23, 33 table; 23*a* top surface; 24 tank; 24*a* supply port; 25 squeegee; 26, 36 laser irradiation unit; 37 nozzle; 28, 38 laser light; 51 secondary particle; 52 primary particle.

The invention claimed is:

1. A method for manufacturing an alloy molded product, in which different metals are melted, using powder for metallurgy, the method comprising:
   a step of spreading the powder for metallurgy on a table;
   a step of irradiating a part of the powder for metallurgy on the table with laser light so as to melt the laser-irradiated part of the powder for metallurgy;
   a step of further spreading the powder for metallurgy on the powder for metallurgy having been irradiated with the laser light; and
   a step of irradiating a part of the further spread powder for metallurgy with the laser light so as to melt the laser-irradiated part of the further spread powder for metallurgy, wherein
   the powder for metallurgy includes a plurality of secondary particles, each secondary particle being obtained by combining a plurality of primary particles with a binder,
   the plurality of secondary particles includes first secondary particles and second secondary particles having different peaks of particle sizes from each other in a particle size distribution, and
   the plurality of primary particles included in each of the first secondary particles includes a majority of one of the different metals in the alloy molded product, and the plurality of primary particles included in each of the second secondary particles includes a majority of another metal of the different metals in the alloy molded product.

2. A method for manufacturing an alloy molded product, in which different metals are melted, using powder for metallurgy, the method comprising:
   a step of irradiating a table with laser light:
   a step of spraying the powder for metallurgy toward a position irradiated with the laser light so as to melt a part of the sprayed powder for metallurgy which is irradiated with the laser light; and
   a step of moving the position irradiated with the laser light and a position to which the powder for metallurgy is sprayed in association with each other, wherein
   the powder for metallurgy includes a plurality of secondary particles, each secondary particle being obtained by combining a plurality of primary particles with a binder,
   the plurality of secondary particles includes first secondary particles and second secondary particles having different peaks of particle sizes from each other in a particle size distribution, and
   the plurality of primary particles included in each of the first secondary particles includes a majority of one of the different metals in the alloy molded product, and the plurality of primary particles included in each of the second secondary particles includes a majority of another metal of the different metals in the alloy molded product.

3. The method for manufacturing an alloy molded product according to claim 1, wherein:
   the plurality of primary particles includes at least one of ceramic and cermet.

4. The method for manufacturing an alloy molded product according to claim 2, wherein:
   the plurality of primary particles includes at least one of ceramic and cermet.

5. The method for manufacturing an alloy molded product according to claim 1, wherein:
   the plurality of secondary particles are spherical.

6. The method for manufacturing an alloy molded product according to claim 5, wherein:
   the plurality of primary particles are non-spherical.

7. The method for manufacturing an alloy molded product according to claim 1, wherein:
   the plurality of primary particles are non-spherical.

8. The method for manufacturing an alloy molded product according to claim 1, wherein:
   both of said irradiatings irradiate the powders which include the binder.

9. The method for manufacturing an alloy molded product according to claim 2, wherein:
   the plurality of secondary particles are spherical.

10. The method for manufacturing an alloy molded product according to claim 9, wherein:
    the plurality of primary particles are non-spherical.

11. The method for manufacturing an alloy molded product according to claim 2, wherein:
    the plurality of primary particles are non-spherical.

12. The method for manufacturing an alloy molded product according to claim 2, wherein:
    the spraying sprays the powders which include the binder.

* * * * *